(12) United States Patent
Fung

(10) Patent No.: US 9,692,074 B2
(45) Date of Patent: Jun. 27, 2017

(54) SOLID OXIDE FUEL CELL STRUCTURE

(75) Inventor: Kuan-Zong Fung, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 433 days.

(21) Appl. No.: 13/451,176

(22) Filed: Apr. 19, 2012

(65) Prior Publication Data

US 2012/0270140 A1 Oct. 25, 2012

(30) Foreign Application Priority Data

Apr. 22, 2011 (TW) .............................. 100114025 A

(51) Int. Cl.
*H01M 8/243* (2016.01)
*H01M 8/1226* (2016.01)
*H01M 4/86* (2006.01)
*H01M 8/124* (2016.01)

(52) U.S. Cl.
CPC ....... *H01M 8/1226* (2013.01); *H01M 4/8626* (2013.01); *H01M 2008/1293* (2013.01); *Y02P 70/56* (2015.11)

(58) Field of Classification Search
CPC ... Y02E 60/525; H01M 8/243; H01M 8/0252; H01M 8/004
See application file for complete search history.

(56) References Cited

U.S. PATENT DOCUMENTS

| | | | |
|---|---|---|---|
| 2001/0012576 A1 | 8/2001 | Christiansen | |
| 2006/0177715 A1* | 8/2006 | Wu et al. | ......................... 429/31 |
| 2008/0164641 A1* | 7/2008 | Lee | ......................... B01D 53/22 |
| | | | 264/519 |
| 2009/0191440 A1 | 7/2009 | Ohmori et al. | |
| 2010/0009228 A1 | 1/2010 | Zafred et al. | |
| 2010/0330457 A1 | 12/2010 | Ohmori | |
| 2011/0177434 A1* | 7/2011 | Maus | ....................... B28B 1/24 |
| | | | 429/535 |

FOREIGN PATENT DOCUMENTS

| | | |
|---|---|---|
| TW | 200423469 | 11/2004 |
| TW | 200717905 | 5/2007 |
| TW | I285454 B | 8/2007 |
| TW | 200933967 A | 8/2009 |
| TW | 201027825 A | 7/2010 |
| WO | WO-9422177 A1 | 9/1994 |
| WO | WO-2005055350 A1 | 6/2005 |

OTHER PUBLICATIONS

Taiwan Patent Office, Office Action, Patent Application Serial No. TW100114025, Nov. 12, 2013, Taiwan.
China Patent Office, Office Action, Patent Application Serial No. CN201210115197.4, Dec. 4, 2013, China.

* cited by examiner

*Primary Examiner* — Lucas J. O'Donnell

(57) ABSTRACT

A solid oxide fuel cell structure includes an anode, a cathode arranged oppositely relative to the anode and electrolyte located between the anode and the cathode and at least two air paths each having a distal end provided with a turn and a continuous surface on the inner surface of the distal end.

1 Claim, 4 Drawing Sheets

SOLID OXIDE FUEL CELL STRUCTURE

CROSS-REFERENCE TO RELATED APPLICATION

This application claims priority from application No. 100114025, filed on Apr. 22, 2011 in the Taiwan Intellectual Property Office.

FIELD OF THE INVENTION

The present invention is related to the structure of solid state electrolyte in a fuel cell structure, and more particularly to a solid oxide fuel cell structure having air paths defined beside the anode and cathode and on two sides of the electrolyte. Each of the air paths has a distal end provided with a turn and a continuous curve to spread stress during manufacture and to prolong its lifespan.

BACKGROUND OF THE INVENTION

A fuel cell (FC) has higher energy conversion rate than the conventional batteries and poses no threat to the environment. Its importance is now playing a vital role in the new energy era.

A fuel cell generally converts chemical energy into electricity through a circuit composed by the cathode, the anode and the electrolyte as well as the potential difference between reducible fuel such as hydrogen and oxide gas such as oxygen to undergo a spontaneously oxidation reduction. The byproduct of this oxidation reduction will be water or carbon dioxide ($CO_2$) only so that there is no pollution issue to use this kind of reaction.

Based on ion variation and ion conduction differences, a fuel cell generally is categorized to five different types and among which, the solid oxide fuel cell, SOFC, also called ceramic fuel cell, has the highest reaction rate and requires no activator to undergo the reaction. In addition, the SOFC is available for various fuels and the byproduct, steam, during its reaction is good for steam-power generation industry. The conversion rate for this steam-power generation reaches more than 80% efficiency.

During the use of a solid oxide fuel cell, the fuel containing carbon monoxide (CO) and hydrogen ($H_2$) flows through air paths and diffuses on the surface of the anode. If the distal ends of the air paths are right angles and the fuel in gas type flows through the distal ends, stress at the right angles of the air paths distal ends builds up, which will easily break the distal ends of the air paths due to large concentration of air pressure.

Furthermore, because the electrolyte is sandwiched between the anode and the cathode, while in manufacture, if the distal ends of the air paths are right angles, the distal ends will easy be stress concentrated and eventually cause breakage during curing. Other factors such as differences among material characteristics will too cause the breakage to the distal ends of the air paths during drying and expansion and contraction (cooling process).

As a result of these problems, the most crucial problem to be solved is to create an air path that will disperse the stress both in the manufacture process and in the reaction process.

SUMMARY OF THE INVENTION

The objective of the present invention is to provide a solid oxide fuel cell structure having at least two air paths. One air path corresponds to the anode. Another air path corresponds to the cathode. Both have an inlet end, a main path and a distal end. The distal end has a continuous surface. The main path intersects with the continuous surface of the distal end at a turn. The turn between the main path and the continuous surface of the distal end is continuous without singularity after differentiating.

Another objective of the present invention is to provide a solid oxide fuel cell structure having at least two air paths each provided with a continuous surface so that breakage during manufacturing processes such as drying, sintering and curing can be avoided and the yield of the solid oxide fuel cell is thus high.

DETAILED DESCRIPTION OF THE PRESENT INVENTION

Figure 1A:
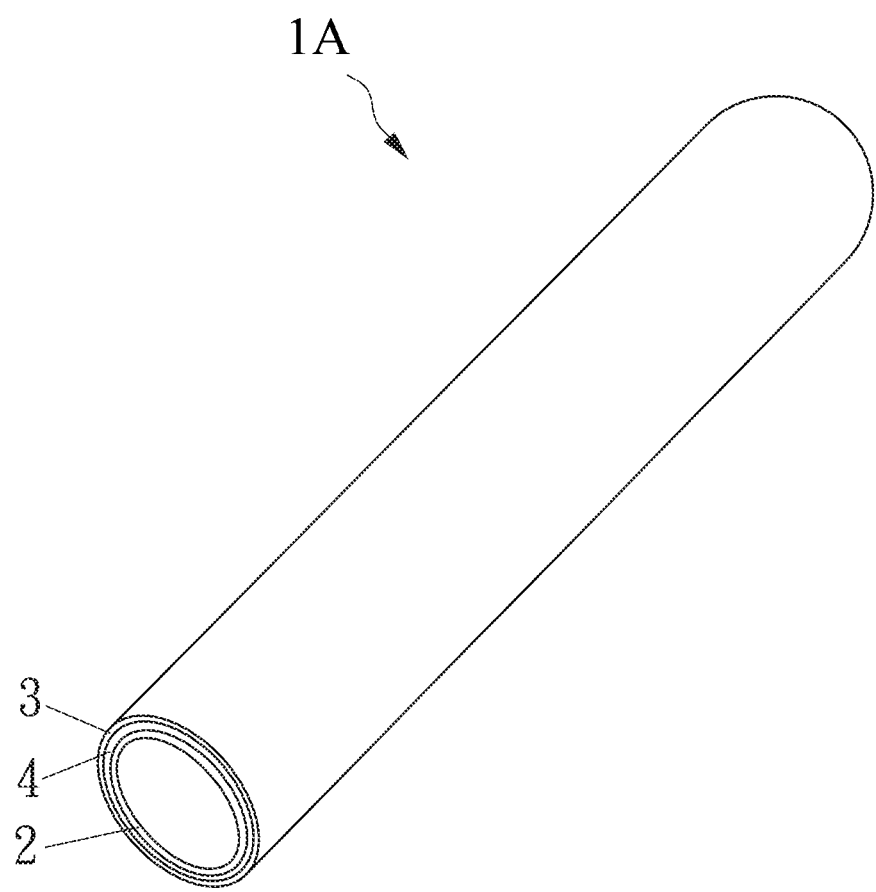
FIG. 1A is a perspective view of a preferred embodiment of the solid oxide fuel cell structure of the present invention.

Hereinafter, embodiments of the present invention will now be described in greater detail with reference to the accompanying drawings.

To achieve aforesaid goals and effects, for thorough understanding, the techniques and structures adopted by the preferred embodiment of the invention is illustrated in detail with its features and functions described as below.

It is well known in the art that a solid oxide fuel cell is generally composed of an anode 2, a cathode 3 oppositely located relative to the anode and an electrolyte 4 sandwiched between the anode 2 and the cathode 3. The solid oxide fuel cell structure is a three layer thin film porous structure and consists of ceramic material. The anode 2 (or the cathode 3) is the innermost layer. The electrolyte 4 is in the middle. The cathode 3 (or the anode 2) is the outermost layer arranged oppositely relative to the innermost layer. In addition, multiple air paths 4, such as first air path 1A and second air path 1B (at least two) are defined along the anode 2 and the cathode 3 to allow reducible fuel such as hydrogen and the like and oxygen to flow therethrough.

Figure 1B:
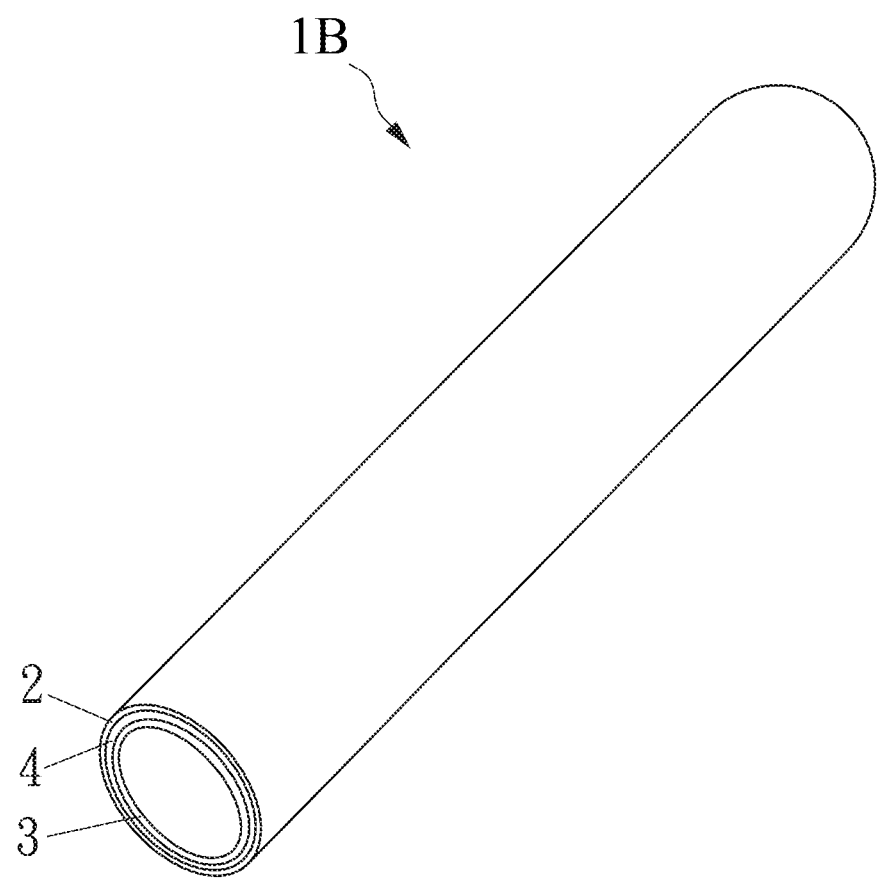
FIG. 1B is a perspective view of another preferred embodiment of the solid oxide fuel cell structure of the present invention.
Figure 2:
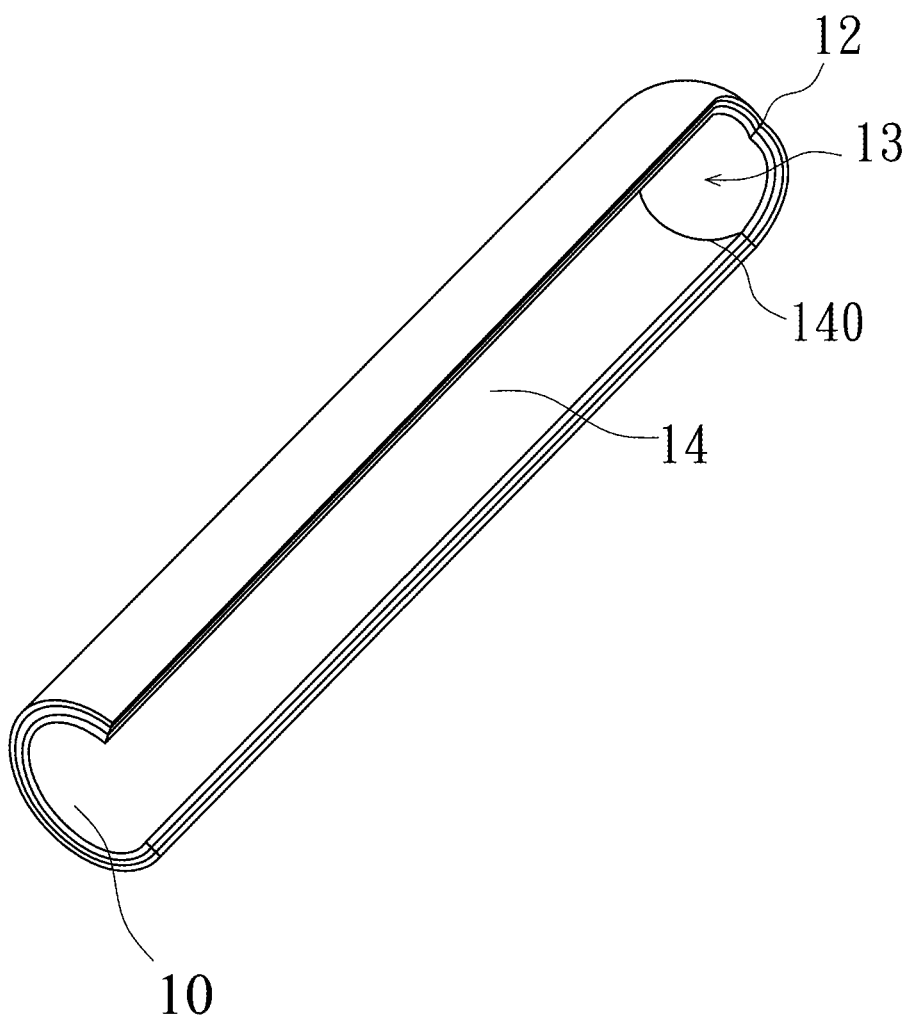
FIG. 2 is another perspective view of the preferred embodiment of the solid oxide fuel cell structure with a portion of the structure removed.

With reference to FIGS. 1A, 1B and 2, each of the first and second air paths 1A and 1B is provided with an inlet end 10, a main path 14 and a distal end 12. The distal end 12 has a continuous surface 13. First air path 1A corresponds to the anode 2, Second air path 1B corresponds to the cathode 3 The main path 14 intersects with the continuous surface 13 of the distal end 12 at a turn 140. The turn 140 between the main path 14 and the continuous surface 13 of the distal end 12 is continuous without singularity after differentiating. The continuous surface 13 is a section of quadric surface, camber or parabolic quadratic surface, the continuous surface 13 corresponds to a function and is also continuous without singularity after differentiating.

Based on ion variations and ion conduction differences, a fuel cell generally is categorized to five different types and among which, the solid oxide fuel cell, SOFC, also called ceramic fuel cell, is exemplarily used for the preferred embodiment of the present invention. Because the electrical resistance of the anode 2, the cathode 3 and the electrolyte 4 are different from one another and increase as the thickness of the material for making each of the anode 2, the cathode 3 and the electrolyte 4 becomes thicker, the SOFC has the following types, electrolyte supported cell, the cathode 3 supported cell and the anode 2 supported cell. Because the anode 2 has much higher conduction rate than the cathode 3 and the electrolyte 4, using the anode 2 supported cell will greatly reduce the electrical resistance within the cell. However, manufacture of the thin film used in this kind of solid oxide fuel cell is difficult and a breakthrough in the related technology is required to solve the dilemma.

Figure 3:
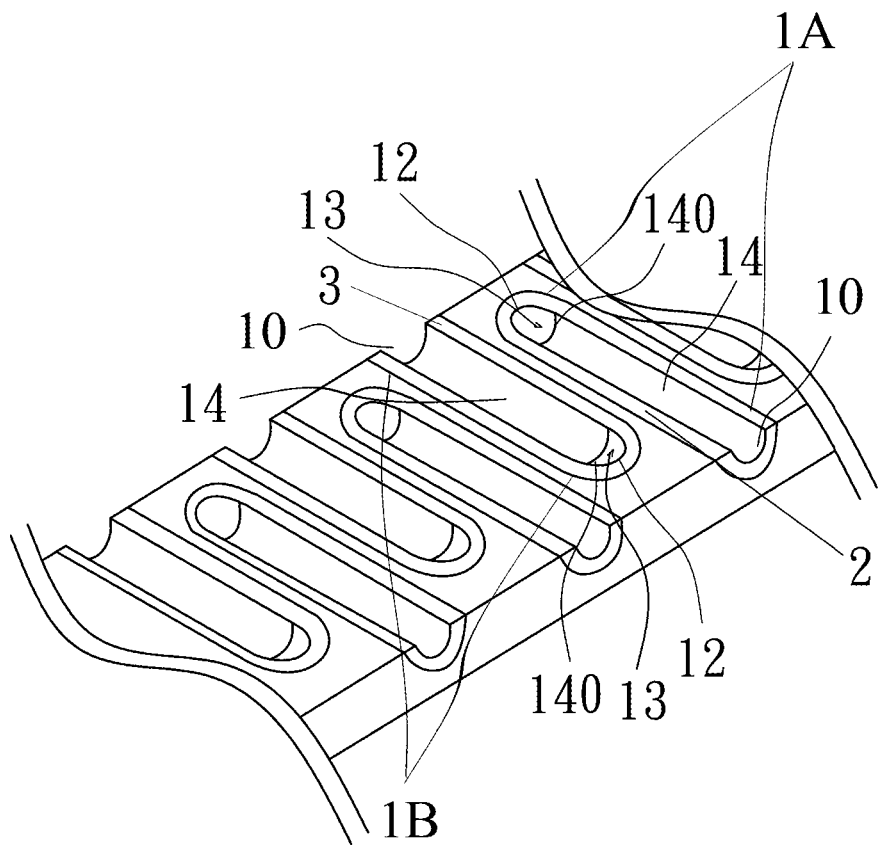
FIG. 3 is still a cross-sectional perspective view showing a different embodiment of the solid oxide fuel cell structure of the present invention.

With reference to FIG. 3, it is noted that the first and second air paths 1A and 1B are arranged alternately to have one for the reducible fuel and the other for gas. Accordingly, each of the plurality of first air paths 1A correspond to the anode 2, and each of the plurality of second air paths 1B correspond to the cathode 3. The plurality of first air paths 1A and the plurality of second air paths 1B are arranged alternately along a common plane. Each of the first air paths 1A correspond to the anode 2 being the innermost layer, electrolyte being in the middle, and the cathode 3 being the layer arranged oppositely relative to the innermost layer and each of the second air paths 1B correspond to the cathode 3 being the innermost layer, electrolyte being in the middle, and the anode 2 being the layer arranged oppositely relative to the innermost layer. Each of the first and second air paths 1A and 1B have an inlet end 10, a main path 14 having a semicircular cross-section, and a distal end 12 having a continuous curve 13. The first air paths 1A are alternately adjacent to one another with one of the second air paths 1B interposed between each pair of the first air paths 1A, and the first air paths 1A extend along a first direction from the inlet ends 10 thereof to the distal ends 12 thereof. The second air paths 1B are alternately adjacent to one another with one of the first air paths 1A interposed between each pair of the second air paths 1B, and the second air paths 1B extend along a second direction from the inlet ends 10 thereof to the distal ends 12 thereof. The first direction is opposite the second direction. The distal end 12 of each of the first air paths 1A is directly adjacent to a portion of the main path 14 of one or two of the second air paths 1B, and the distal end 12 of each of the second air paths 1B is directly adjacent to a portion of the main path 14 of one or two of the first air paths 1A. The main path 14 and the distal end 12 have a turn 140 therebetween, wherein the turn 140 is continuous without singularity after differentiating. The continuous curve 13 of the distal ends 12 are sections of a quadratic, camber, or parabolic quadratic curve.

It is to be noted that the design of the continuous curve is extremely helpful in spreading the stress when the gas-type fuel flows to the anode as well as the cathode and diffuses. Furthermore, during the manufacture process, the continuous surface is also helpful in spreading the stress caused by the curing processes such as drying and cooling. The outer contour of the distal end of each of the air paths 1 being a section of spherical shape is also helpful in enhancing the strength of the air paths 1.

While various embodiments are discussed herein, it will be understood that they are not intended to limit to these embodiments. On the contrary, the presented embodiments are intended to cover alternatives, modifications and equivalents, which may be included within the spirit and scope of the various embodiments. Furthermore, in this Description of Embodiments, numerous specific details are set forth in order to provide a thorough understanding of embodiments of the present subject matter. However, embodiments may be practiced without these specific details. In other instances, well known steps, procedures, components, and circuits have not been described in detail as not to unnecessarily obscure aspects of the described embodiments.

What is claimed is:

1. A solid oxide fuel cell structure, comprising:
an anode;
a cathode arranged oppositely relative to the anode;
an electrolyte located between the anode and cathode; and
a plurality of first air paths and a plurality of second air paths arranged alternately along a common plane, each of the first air paths correspond to said anode and each of the second air paths correspond to said cathode, each of the first and second air paths have an inlet end, a main path having a semicircular cross-section, and a distal end having a continuous curve;
wherein the first air paths are alternately adjacent to one another with one of the second air paths interposed between each pair of the first air paths, and the first air paths extend along a first direction from the inlet ends thereof to the distal ends thereof, and wherein the second air paths are alternately adjacent to one another with one of the first air paths interposed between each pair of the second air paths, and the second air paths extend along a second direction from the inlet ends thereof to the distal ends thereof, wherein the first direction is opposite the second direction;
wherein the distal end of each of the first air paths is directly adjacent to a portion of the main path of one or two of the second air paths, and the distal end of each of the second air paths is directly adjacent to a portion of the main path of one or two of the first air paths; and
wherein the main path and the distal end have a turn therebetween, wherein the turn is continuous without singularity after differentiating; and
wherein the continuous curve of the distal ends are sections of a quadratic, camber, or parabolic quadratic curve.

* * * * *